United States Patent Office 3,404,156
Patented Oct. 1, 1968

3,404,156
IMIDAZOLIN-2-YL-ALKYL-SUBSTITUTED INDOLES
Sydney Archer, Bethlehem, N.Y., assignor to Sterling Drug Inc., New York, N.Y., a corporation of Delaware
No Drawing. Filed Feb. 23, 1966, Ser. No. 529,206
3 Claims. (Cl. 260—309.6)

ABSTRACT OF THE DISCLOSURE

A series of 1-(2-imidazolin-2-ylalkyl)-3-alkylindoles useful as nasal decongestants are prepared by interaction of (3-alkyl-1-indole)-alkanenitriles and ethylene diamine in the presence of a small amount of carbon disulfide.

---

This invention relates to new and useful chemical compounds and to a process for preparing the same.

The compounds of the instant invention are 1-(2-imidazolin-2-ylalkyl)-3-(R)indoles having in free base form the structural formula:

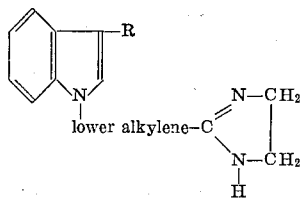

Formula I wherein R is lower alkyl and lower alkylene comprises from 1 to 3 carbon atoms having the valence bonds attached to the same or different carbon atoms. The group R includes straight- or branched-chain alkyl having from one to about six carbon atoms, for example methyl, ethyl, n-propyl, isopropyl, n-butyl, isobutyl, n-amyl, n-hexyl and the like. Methyl and ethyl are the preferred lower alkyl radicals. The term alkyl as used in the generic name for the compounds of my invention includes straight- or branched-chain lower alkylene groups having from one to three carbon atoms, for example methylene, 1,2-ethylene, ethylidene, 1,3-propylene, 1,2-propylene, 2,3-propylene, isopropylidene and the like.

In accordance with the process of this invention, my new 1-(2-imidazolin-2-ylalkyl)-3-(R)-indoles are obtained by reacting a 3-(R)-1-indolealkanenitrile of the formula

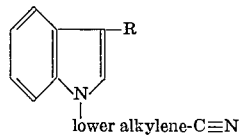

Formula II with ethylene diamine in the presence of a small amount of carbon disulfide. The carbon disulfide or its sulfur-containing reaction products participate in the reaction, but as these sulfur-containing products are regenerated, less than a stoichiometric amount is required.

The nitrile starting materials of Formula II above, are readily obtained by reacting a 3-(R)-indole with a haloalkanenitrile in the presence of a strong base.

The compounds of my invention have been found by standard pharmacological testing procedures to have a high vasoconstrictor effect, indicating their usefulness for shrinking mucosal tissue and their application as nasal decongestants.

The 1-(2-imidazolin-2-ylalkyl)-3-(R)-indoles of Formula I are basic substances and interact with acids to form acid-addition salts. The preferred salts are the physiologically-acceptable acid-addition salts, that is the acid-addition salts wherein the anions are relatively innocuous to the animal organism when administered in the therapeutic dosages. Appropriate acid-addition salts of this type are those prepared by the addition of mineral acids, for example, hydrochloric acid, hydrobromic acid, nitric acid, sulfuric acid, phosphoric acid and the like, and from organic carboxylic and sulfonic acids, for example, acetic acid, citric acid, tartaric acid, lactic acid, gluconic acid, maleic acid, methanesulfonic acid, benzenesulfonic acid, meconic acid, p-chlorobenzenesulfonic acid, and the like.

Although the acid-addition salt forms preferably have anions which are pharmacologically acceptable, salts having toxic anions are also useful, since they serve as sources of the free base forms and as intermediates for non-toxic salts by way of ion-exchange reactions. All acid-addition salts, regardless of the nature of the anions, are useful as intermediates in the purification of the free bases and as characterizing derivatives of the free bases.

The acid-addition salt forms are conveniently prepared by dissolving the free base in an aqueous solution containing the appropriate acid and isolating the salt by evaporating the solvent, or by reacting the free base and the acid in an organic solvent in which case the salt separates directly or can be isolated by concentrating the solution.

Aqueous solutions of the physiologically-acceptable acid-addition salts of the compounds of my invention are prepared for intranasal medication by any of the accepted methods for such medication, for example, drops, spray, irrigation and such.

The following examples serve to illustrate the invention without limiting the latter thereto.

Example 1.—1-(2-imidazolin-2-ylmethyl)-3-methylindole (a) A suspension of 4.6 g. (0.19 m.) of sodium hydride in 155 ml. of dimethylformamide, cooled by ice, was stirred while, during thirty minutes, a solution of 25.0 g. (0.19 m.) of 3-methylindole in 155 ml. of dimethylformamide was added dropwise. At the end of the addition, the ice bath was removed for ten minutes. Cooling was resumed and during thirty minutes at 5–15° C., a solution of 14.4 g. (0.19 m.) of chloroacetonitrile in 15.0 ml. of dimethylformamide was added dropwise. The cooling bath was removed at the end of the addition and the reaction mixture was stirred at 25° C. for sixteen hours. The reaction mixture was added to 1.5 l. of water and the oil that separated was extracted with diethyl ether. The ether solution was washed with water and saturated solution of sodium chloride. The dried ether extract was concentrated to yield 28.0 g. of 3-methyl-1-indoleacetonitrile as a dark oil.

(b) To a mixture of 28.0 g. (0.165 m.) of 3-methyl-1-indoleacetonitrile and 12.0 g. (0.20 m.) of ethylenediamine there was added 1.0 ml. of carbon disulfide. The mixture was heated in a 130–140° C. oil bath under an atmosphere of nitrogen gas for two hours and was then set aside at 25° C. for sixteen hours. The reaction mixture was dissolved in chloroform and the solution extracted with water and then with an excess of 1.5 N hydrochloric acid solution. The aqueous acid solution was chilled and made alkaline by the addition of thirty-five percent sodium hydroxide solution. The oil that separated was extracted with chloroform and the organic layer washed with water. The dried chloroform solution was evaporated leaving 16.4 g. of 1-(2-imidazolin-2-ylmethyl)-3-methylindole. The monohydrochloride salt, prepared by treatment of the free base with an ethyl alcohol solution of anhydrous hydrochloric acid, melted with decomposition at 236.0–237.0° (corr.).

Example 2.—1-(2-imidazolin-2-ylmethyl)-3-ethylindole (a) A solution of 32.0 g. (0.22 m.) of 3-ethylindole in 100 ml. of dimethylformamide was added dropwise during forty-five minutes to a stirred, ice-cold suspension of 5.75 g. (0.24 m.) of sodium hydride in 175 ml. of dimethylformamide. After fifteen minutes, a solution of 19.0 g. (0.25 m.) of chloroacetonitrile in 15.0 ml. of dimethylfromamide was added dropwise during fifteen minutes to the cold reaction mixture. At the end of the addition the ice bath was removed and stirring was continued for sixteen hours at 25° C. The reaction mixture was filtered through diatomaceous earth and the filtrate evaporated. The residue was dissolved in diethyl ether and the solution washed with water and saturated solution of sodium chloride. The dried ether solution was evaporated yielding 32.0 g. of 3-ethyl-1-indoleacetonitrile as a dark liquid.

(b) The indoleacetonitrile obtained above was mixed with 10.8 g. (0.18 m.) of ethylenediamine and to the mixture there was added dropwise, 15 drops of carbon disulfide. The reaction mixture was then heated in a 140° C. oil bath under an atmosphere of nitrogen gas for two hours and then was held at 25° C. for three hours. The mixture was dissolved in diethyl ether, the solution washed with water and extracted with an excess of 1.5 N hydrochloric acid solution. The aqueous acid extract was chilled and made alkaline by the addition of thirty-five percent sodium hydroxide solution. The separated oil was extracted with diethyl ether and the ether solution washed with water and saturated sodium chloride solution. The dried ether solution was evaporated yielding 22.0 g. of solid. Recrystallization from cyclohexane with the aid of decolorizing charcoal yielded 15.8 g. of 1-(2-imidazolin-2-ylmethyl)-3-ethylindole melting at 90–100° C. The monohydrochloride salt, prepared by treating an isoproply alcohol solution of the free base with gaseous anhydrous hydrochloric acid, melted with decomposition at 258.0–260.0° C. (corr.).

When subjected to standard pharmacological testing procedures, 1 - (2 - imidazolin-2-ylmethyl)-3-ethylindole prepared as above described, was found to have a high vasoconstrictor effect. For example, when tested by the isolated rabbit aortic strip procedure, this compound was found to have five times the vasoconstrictor activity of the known compound, 3-(2-imidazolin-2-ylmethyl)indole.

Example 3.—1-(2-imidazolin-2-ylmethyl)-3-n-propylindole (a) Following the procedure of Example 1a, chloroacetonitrile and 3-n-propylindole were reacted with sodium hydride. Distillation at reduced pressure and recrystallization from ether-pentane mixture gave 3-n-propyl-1-indoleacetonitrile having a melting point at 54–56° C.

(b) Using the procedure described in Example 1b, ethylene diamine and 3-n-propyl-1-indoleacetonitrile can be reacted with carbon disulfide to prepared 1-(2-imidazolin-2-ylmethyl)-3-n-propylindole.

Example 4.—1-[3-(2-imidazolin-2-yl)propyl]-3-n-hexylindole (a) Following the procedure of Example 1a, but substituting 3-n-hexylindole for 3-methylindole and using 4-chlorobutyronitrile in place of chloroacetonitrile there is obtained 4-(3-n-hexyl-1-indolyl)butyronitrile.

(b) Using the procedure described in Example 1b hereinabove, ethylene diamine and 4-(3-n-hexyl-1-indolyl) butyronitrile can be reacted with carbon disulfide to obtain 1-[3-(2-imidazolin-2-yl)propyl]-3-n-hexylindole.

Example 5.—1-[2-(2-imidazolin-2-yl)-1-methylethyl]-3-n-butylindole (a) When 3-n-butylindole is caused to react with 3-chlorobutyronitrile according to the procedure described in Example 1a hereinabove, there is obtained β-(3-n-butyl-1-indolyl)-β-methylpropionitrile.

(b) Following the procedure of Example 1b, the reaction of β-(3-n-butyl-1-indolyl)-β-methylpropionitrile with ethylene diamine in the presence of a small amount of carbon disulfide gives 1-[2-(2-imidazolin-2-yl)-1-methylethyl]-3-n-butylindole.

I claim:
1. 1-(2-imidazolin-2-ylalkyl-3-(R)indole wherein R is lower alkyl and alkyl has 1 to 3 carbon atoms.
2. 1-(2-imidazolin-2-ylmethyl)-3-methylindole.
3. 1-(2-imidazolin-2-ylmethyl)-3-ethylindole.

References Cited
UNITED STATES PATENTS

| | | | |
|---|---|---|---|
| 2,505,247 | 4/1950 | Isler | 260—309.6 |
| 2,505,248 | 4/1950 | Isler et al. | 260—309.6 |
| 2,569,415 | 9/1951 | Hartmann et al. | 260—309.6 |
| 2,751,393 | 6/1956 | Schindler et al. | 260—309.6 |
| 2,778,836 | 1/1957 | Morren | 260—309.6 |
| 2,868,802 | 1/1959 | Hueni | 260—309.6 |

OTHER REFERENCES

Scholz Ind. Eng. Chem. vol. 37, pp. 120-5 (1945).

HENRY R. JILES, *Primary Examiner.*

NATALIE TROUSOF, *Assistant Examiner.*